United States Patent
Mak et al.

(10) Patent No.: US 11,874,231 B1
(45) Date of Patent: Jan. 16, 2024

(54) SYSTEM AND METHOD FOR GEMSTONE IDENTIFICATION

(71) Applicant: Chow Sang Sang Jewellery Company Limited, Hong Kong (CN)

(72) Inventors: Shuk Kwan Mak, Hong Kong (CN); Wai Chiu Lam, Hong Kong (CN); Tat Ming Ng, Hong Kong (CN); Kwok Bun Cheng, Hong Kong (CN)

(73) Assignee: CHOW SANG SANG JEWELLERY COMPANY LIMITED, Hong Kong (CN)

( * ) Notice: Subject to any disclaimer, the term of this patent is extended or adjusted under 35 U.S.C. 154(b) by 0 days.

(21) Appl. No.: 18/226,738

(22) Filed: Jul. 26, 2023

(30) Foreign Application Priority Data

Jun. 21, 2023 (HK) .......................... 32023074826.3

(51) Int. Cl.
| | |
|---|---|
| *G01N 21/87* | (2006.01) |
| *G06T 7/00* | (2017.01) |
| *G06V 10/30* | (2022.01) |
| *G06V 10/44* | (2022.01) |
| *G06V 20/66* | (2022.01) |

(52) U.S. Cl.
CPC ............. *G01N 21/87* (2013.01); *G06T 7/001* (2013.01); *G06V 10/30* (2022.01); *G06V 10/443* (2022.01); *G06V 20/66* (2022.01); *G06T 2207/10016* (2013.01); *G06T 2207/20081* (2013.01)

(58) Field of Classification Search
CPC .................... G01N 21/87; G06T 7/001; G06T 2207/10016; G06T 2207/20081; G06V 10/30; G06V 10/443; G06V 10/66
See application file for complete search history.

(56) References Cited

U.S. PATENT DOCUMENTS

| | | | |
|---|---|---|---|
| 10,726,290 B2 * | 7/2020 | Kerner | .................. G06T 7/75 |
| 11,037,282 B2 | 6/2021 | Tong et al. | |
| 11,103,036 B2 | 8/2021 | Nyfeler et al. | |
| 11,232,553 B2 | 1/2022 | Parikh et al. | |
| 2004/0072137 A1 * | 4/2004 | Lapa | ..................... G09B 5/02 434/386 |

(Continued)

FOREIGN PATENT DOCUMENTS

| | | |
|---|---|---|
| CN | 108846403 A | 11/2018 |
| CN | 112289172 A | 1/2021 |

(Continued)

*Primary Examiner* — Sang H Nguyen
(74) *Attorney, Agent, or Firm* — Law Offices of Albert Wai-Kit Chan, PLLC (57) ABSTRACT

This invention provides a computer implemented method to identify a specific gemstone with a known reference point. In one embodiment, said computer implemented method, comprises the steps of: (a) detecting said known reference point from a source image of said specific gemstone; (b) Retrieving one or more reference images of possible gemstones from a gemstone database based on said known reference point; (c) extracting edge features from said source image and said one or more reference images; (d) computing a similarity value by matching said edge features from each of said one or more reference images against said source image; and (e) identifying said specific gemstone from said one or more reference images based on said similarity value.

18 Claims, 6 Drawing Sheets

(56) References Cited

U.S. PATENT DOCUMENTS

| | | | | |
|---|---|---|---|---|
| 2005/0117145 A1* | 6/2005 | Altman | ............... | G01N 21/87 |
| | | | | 356/30 |
| 2005/0190357 A1* | 9/2005 | Sasian | ............... | G01N 21/01 |
| | | | | 356/30 |
| 2010/0250201 A1* | 9/2010 | Sivovolenko | ...... | G01N 21/87 |
| | | | | 703/1 |
| 2012/0007971 A1* | 1/2012 | Schnitzer | ........... | H04N 23/62 |
| | | | | 348/61 |
| 2014/0063292 A1* | 3/2014 | Wagner | ............ | G02B 27/027 |
| | | | | 359/726 |
| 2016/0232432 A1* | 8/2016 | Regev | ............... | G06V 20/647 |
| 2018/0082116 A1* | 3/2018 | Navot | ............... | G06V 20/80 |
| 2021/0027447 A1* | 1/2021 | Parikh | ............. | G06F 18/22 |

FOREIGN PATENT DOCUMENTS

| | | | |
|---|---|---|---|
| IN | 113486905 A | 10/2021 | |
| WO | 2014036460 A2 | 3/2014 | |
| WO | 2016092568 A2 | 6/2016 | |

\* cited by examiner

Performance of Methodology Tested with Authentic Diamond Sample Pairs

|  | Proposed Methodology | Proposed Methodology Without Key Descriptor & Image Rectification | Proposed Methodology Without Filter |
|---|---|---|---|
| Predicted Positive | 498 | 0 | 0 |
| Predicted Negative | 2 | 500 | 500 |
| Accuracy | 99.6% | 0% | 0% |

Figure 6

Performance of Methodology in Searching for the Matching Diamond Sample

| Class | True Positive | True Negative |
|---|---|---|
| Predicted Positive | 1 | 0 |
| Predicted Negative | 0 | 95637 |

Figure 7

Performance of Methodology in Extreme Lighting Conditions

| Brightness and Contrast Condition | Methodology Accuracy | Inspected Image |
|---|---|---|
| -60% | 97.2% |  |
| -40% | 99% |  |
| -20% | 99% |  |
| Original | 99.6% |  |
| 20% | 97.6% |  |

Figure 8

SYSTEM AND METHOD FOR GEMSTONE IDENTIFICATION

FIELD OF THE INVENTION

The present invention relates to systems and methods for gemstone identification.

BACKGROUND OF THE INVENTION

Gemstones, such as diamond, are highly valued for their rarity, beauty and durability, making them a sought-after item for collectors and investors alike. However, the high value of gemstones has made them a target for counterfeiters and fraudsters who seek to profit from them. These criminals could replace authentic gemstones with counterfeit ones in warehouse storage, during the transportation process to storefront as well as during display in storefronts.

Currently, gemstone authentication is often done by trained gemologists who use specialized equipment such as microscopes to perform intricate inspection of the gemstones. However, this process can be time-consuming, expensive, and not readily available, especially in storefront environment. As a result, there is a need for a portable and efficient method of gemstone authentication that can be easily used by non-experts and deployable in store locations which may not have constant internet connection.

In the context of the present invention, an edge device is a device that can have both the capability to process data locally as well as cloud connectivity. Edge devices are designed to be more efficient and offer real-time processing capabilities, even when there is limited connectivity to the cloud. The edge capability of the gemstone authentication system allows it to locally process streaming video data, reducing the need for high bandwidth and cloud computing capabilities. Making the system ideal for use in storefronts and other locations where consistent cloud connectivity may not be available.

Cut gemstones possess a unique combination of physical characteristics which can be used for identification. Traditional methods include inspection by gemologists to detect changes in the gemstone's size, table facets, angles, inclusions, and other physical properties.

Some gemstones also carry markings of their certification. For instance, diamonds which are certified by reputable laboratories such as GIA and IGI among many others employ this method to mark the certification number on to the girdle. These markings are performed by laser inscription, most commonly done on the girdle of the diamond. Laser inscribed gemstone certifications are permanent provided there are no alterations and repolishing of the diamond.

Given unique physical characteristics and markings each gemstone possesses, along with the recent advances in computer vision and machine learning technologies, it has become possible to authenticate gemstones through image matching. Image matching involves comparing the unique features of a gemstone captured in an image to a database of known authentic gemstones to determine its authenticity. Image matching is also expandable to matching streaming videos against images, as routinely demonstrated by facial identification systems.

US Patent Publication No. 11,037,282 B2 demonstrates the use of machine learning algorithms in clarity characteristics and inclusions identification. Especially of note is the ability of the machine learning algorithms to extract useful information in the form of edges. The present invention takes reference of the capabilities of machine learning algorithms in extracting edges as features, and their ability to be robust to variations in data without reduction in performance, in order to apply it in terms of gemstone authentication.

US Patent Publication No. 11,232,553 B2 further demonstrates the use of a jewelry security analysis system, method and computer program product allowing users to authenticate jewelry items through scanning at least the girdle of the gemstone. The present invention extends on the idea of capturing a section of the gemstone to identify unique characteristics, wherein the present invention only requires the unique markings, such as certificate numbers and brand labels, and surrounding area to be captured.

SUMMARY OF THE INVENTION

This invention provides a computer implemented method to identify a specific gemstone with an inscribed reference point. In one embodiment, said computer implemented method, comprises the steps of: (a) detecting said inscribed reference point from a source image of said specific gemstone; (b) Retrieving one or more reference images of possible gemstones from a gemstone database based on said inscribed reference point; (c) extracting edge features from said source image and said one or more reference images; (d) computing a similarity value by matching said edge features from each of said one or more reference images against said source image; and (e) identifying said specific gemstone from said one or more reference images based on said similarity value.

This invention also provides a non-transitory computer-readable storage medium comprising instructions stored therein which, when executed by one or more processors, cause the one or more processors to perform operations comprising the computer implemented method of this invention.

This invention further provides a system to identify a specific gemstone using the computer implemented method of this invention. In one embodiment, said system comprises: (a) one or more devices adapted to obtain a source image, each of said one or more devices comprising: (i) a first processor; (ii) a memory unit having executable instructions stored thereon, which, when executed, cause the first processor to execute step (a) of said computer implemented method; (iii) a first communication module; (b) a server comprising a second processor, said gemstone database, a second communication module and a memory unit having executable instructions stored thereon, which, when executed, cause the second processor to execute steps (b) to (e) of said computer implemented method; wherein said inscribed reference point is detected and transmitted from the first communication module to the second communication module; said specific gemstone is identified and transmitted from the second communication module to the first communication module.

BRIEF DESCRIPTION OF THE FIGURES

Embodiments of the present disclosure are described by way of annotation with reference to drawings denoting system schematic and modules. Further embodiment is described by user operation flow diagram and user interfaces wireframes.

DETAILED DESCRIPTION OF THE INVENTION

The current invention pertains to a gemstone authentication system and methodology that utilizes video-to-image matching for authentication purposes. The system encompasses a video capturing device that is equipped with an adjustable table that enables the inspection of the gemstone from various angles, wireless transceivers that enable internet and intranet connection, as well as corresponding computational devices for running necessary artificial intelligence algorithms. The methodology for gemstone authentication pertains to detection and recognition of gemstones and corresponding unique identification markings or features or both, extraction of edge features, matching the edge features to reference images and outputting a similarity score, where the decision of authentication pass or fail is determined.

This invention provides a computer implemented method to identify a specific gemstone with a known reference point. In one embodiment, said computer implemented method comprises the steps of: (a) detecting said known reference point from a source image of said specific gemstone; (b) Retrieving one or more reference images of possible gemstones from a gemstone database based on said known reference point; (c) extracting edge features from said source image and said one or more reference images; (d) computing a similarity value by matching said edge features from each of said one or more reference images against said source image; and (e) identifying said specific gemstone from said one or more reference images based on said similarity value.

In one embodiment, said known reference point is an inscribed marking or a natural marking.

In one embodiment, said source image is a still image from a camera or images processed from a streaming video.

In one embodiment, one or more of said steps (a), (b), (c), or (d) are conducted with an artificial intelligence algorithm.

In one embodiment, said artificial intelligence algorithm is trained using labelled images of markings and gemstones, along with augmentations.

In one embodiment, one or more of said steps (a), (b), (c), or (d) comprise filtering image noise.

In one embodiment, said known reference point is on, nearby or outside girdle of said specific gemstone.

In one embodiment, said step (b) comprises generating a string of machine readable text based on record of said known reference point and retrieving said one or more reference images recorded with said string of machine readable text.

In one embodiment, said step (d) comprises aligning edge features of said source image and said one or more reference images. In another embodiment, said step (d) further comprises using edge features from said one or more reference images as a hard filter on the source image.

In one embodiment, said step (e) comprises retaining only images with said similarity value over a threshold value.

This invention also provides a non-transitory computer-readable storage medium comprising instructions stored therein which, when executed by one or more processors, cause the one or more processors to perform operations comprising the computer implemented method of this invention.

This invention further provides a system to identify a specific gemstone using the computer implemented method of this invention. In one embodiment, said system comprises: (a) one or more devices adapted to obtain a source image, each of said one or more devices comprising: (i) a first processor; (ii) a memory unit having executable instructions stored thereon, which, when executed, cause the first processor to execute step (a) of said computer implemented method; (iii) a first communication module; (b) a server comprising a second processor, said gemstone database, a second communication module and a memory unit having executable instructions stored thereon, which, when executed, cause the second processor to execute steps (b) to (e) of said computer implemented method; wherein said known reference point is detected and transmitted from the first communication module to the second communication module; said specific gemstone is identified and transmitted from the second communication module to the first communication module.

In one embodiment, said first communication module or second communication module is a wireless communication module.

In one embodiment, each of said one or more devices comprise a camera or a video camera for obtaining said source image.

In one embodiment, each of said one or more devices comprise illumination for optimal lighting condition for capturing of said source image.

In one embodiment, said system further comprises an adjustable table for positioning said specific gemstone to obtain said source image.

In one embodiment, at least one of said one or more devices is a portable device.

In one embodiment, said server is a cloud server.

This invention also provides automatic in-motion object recognition system and method for gemstone authentication. In one embodiment, said method for gemstone authentication, comprises: (a) Using a video capturing device to capture streaming videos of an inspected loose gemstone or gemstone on a jewelry item; (b) Using captured images of each unique gemstone as reference images for authentication. (c) Using Artificial Intelligence Detection and Recognition algorithm to identify the unique identification markings and features and of the inspected loose gemstone or gemstone on a jewelry item, convert it to machine readable text. The text is used to obtain the corresponding set of reference images of the gemstone; (d) Using artificial intelligence algorithms to recognize, identify, extract edge features and match in real time, the physical characteristics of the inspected gemstone depicted in the inspected image with the identified corresponding reference set of images. The matching result will be scored based on the dis-similarity of the inspected gemstone against the given set of images. (e) Using a threshold for the matching score to determine authentication pass and fail.

In one embodiment, the gemstone can be any type of gemstone, of any type of cut, is attached to other items or a loose stone. The gemstone must contain at least one unique identification markings or features or both for identification.

In one embodiment, the streaming video comprises of digital video.

In one embodiment, the reference images are comprised of digital images.

In one embodiment, each set of reference images needs only one image depicting the unique identification markings or feature or both and the immediate surrounding area of the gemstone. More than one image depicting the inspected item can be used but not strictly needed for the present methodology.

In one embodiment, the Artificial Intelligence Detection & Recognition Algorithm is trained on labeled images of gemstones and unique identification markings or features or both, with augmentations, for detection and recognition of gemstones, unique identification markings or features or both.

In one embodiment, using the training method of this invention, where the Artificial Intelligence Detection & Recognition Algorithm has a certain amount of flexibility allowed, in terms of the captured angle, distortion, lighting conditions, image quality and noise, for the identification and recognition of the gemstones, unique identification markings and features.

In one embodiment, the Artificial Intelligence Detection & Recognition Algorithm contains the step of identifying key descriptors and perform image rectification, which improves matching capability.

In one embodiment, the Artificial Intelligence Edge Detection Algorithm, trained on a set of reference images and their corresponding annotated edges, is used to extract the edge features of the Inspected Image and reference set of images.

In one embodiment, the Artificial Intelligence Edge Detection Algorithm, using the training method of this invention, possesses certain amount of flexibility, in terms of the captured angle, distortion, lighting conditions, quality and noise in the input image, in the extraction of edge feature without degradation in performance.

In one embodiment, the Artificial Intelligence Matching Algorithm, trained on edge features of original and augmented reference images, is used to calculate a Similarity Score.

In one embodiment, said method comprises the step of filtering out noisy edge features in the gemstone image by using the edge features from the reference image as a hard filter.

In one embodiment, said method comprises the step of filtering out noisy edge features improves the matching capability.

In one embodiment, using methods of the present invention, the Artificial Intelligence Matching Algorithm possesses certain amount of flexibility, in terms of noise in the extracted features, without degrading the matching performance.

In one embodiment, the pre-determined similarity threshold is based on the domain knowledge and security requirements of the entity operating the system.

In one embodiment, the matching score is measurement of similarity to the inspected gemstone against the reference image set of the gemstone. A score of 0 is a mismatch while a score of 1 is a match.

This invention also provides a system for gemstone authentication. The system comprises of but is not limited to: (a) A high-resolution video capturing device for capturing streaming videos of the physical characteristics and certificate number of a gemstone. The gemstone could be of any type as described in this invention. (2) A processing unit comprised of a microprocessor and memory capable of running computer programs for the Artificial Intelligence Detection and Recognition Algorithm. (3) A wireless transceiver for internet and intranet connectivity. (4) A battery device for providing electricity to run the system. (5) A display monitor as a medium for: (i) User interaction to control the system and associated computer program. (ii) Displaying streaming video captured by the video capturing device during gemstone viewer mode and the authentication process.

In one embodiment, the high-resolution digital video capturing device of the system can capture a streaming video of the gemstone and its laser inscribed certification number. The distance of the video capturing device from the gemstone is adjustable with a knob.

In one embodiment, the adjustable table is movable to achieve different elevation and orientation through user physical interaction. The adjustments are performed to provide different points of view of the authenticated single gemstone or gemstone on a jewelry item.

In one embodiment, the processing unit of the system can execute a computer program, to run the necessary artificial intelligence algorithms, streaming video processing program, video-to-image matching program on the system.

In one embodiment, the wireless transceiver module of the system can perform wireless transmission of streaming processed video, wireless transmission and receiving of software updates, wireless transmission and receiving of user information and wireless receiving of authentication result.

In one embodiment, the cloud database stores one or many images of gemstones, where at least one of the images depicts the certificate number of the gemstone. In a furthering embodiment, the database stores the corresponding certificate number as a string of each set of images depicting a gemstone.

In one embodiment, the battery system is rechargeable and able to provide enough voltage to power the video capturing device, processing unit, wireless transceiver, display, horizontal and vertical LEDs.

In one embodiment, said system is edge capable. The system can operate with or without the need for the internet. The presence of the internet allows for software and database updates.

In one embodiment, this invention relates to a system and method in authenticating gemstone, and in particular, this system and method is directed to a portable, easy-to-use device that uses a video capturing inspection system to authenticate loose gemstone and gemstone on jewelry items through video-to-image matching.

The present invention generally addresses the need mentioned in the previous section by providing loose gemstone and gemstone on jewelry authentication methodology and system. Further details of the embodiment of this system and method will be described.

In an embodiment of the invention, a novel methodology for authenticating gemstones is introduced. The methodology with a focus on various gemstones, through the analysis of their unique identification markings and physical characteristics. This methodology is designed to be highly automated, catering to various stakeholders in the gemstone industry. The authentication process leverages a series of artificial intelligence algorithms, namely Artificial Intelligence (AI) Detection and Recognition Algorithm, Artificial Intelligence Edge Detection Algorithm and Artificial Intelligence Matching Algorithm, that work in tandem to capture, process, and match gemstone features extracted from streaming digital video footage.

In further embodiment of the invention, the methodology encompasses a comprehensive process that includes the detection and recognition of gemstones and unique markings using AI-based gemstone and unique marking detection and recognition, feature extraction through AI-based edge detection, and AI-based feature matching. The methodology includes description of training and augmentation procedures to increase the robustness of the algorithms against variations in the images captured in the digital video stream. The methodology further introduces a method to filter out image noise at the matching step using features extracted from the reference image. The final step in the authentication process involves calculating a Similarity Score, which is then compared to a pre-determined threshold to determine the authenticity of gemstone. The process is repeated if there is more than one image in the reference set.

By employing AI-based techniques for edge detection and feature matching, the methodology aims to overcome challenges related to image noise, variations in image quality, and other factors that may impact the accuracy of the authentication process. The automatic authentication process minimizes the need for human intervention during these crucial steps traditionally performed manually by gemologists.

In another embodiment of the invention, the system is a device for gemstone authentication consisting of modules which allows user control through physical interactions and capture streaming video. The system is also capable of processing, transmitting, receiving data through internet and intranet, communicating with cloud-based servers. A non-limiting example of the system is as presented. Multiple systems are deployed in multiple storefronts. These local systems each include a high-resolution digital video capturing device, processor unit, wireless internet and intranet connectivity modules and display. A local system is operated by intended users to capture streaming video of the targeted gemstone using the video capturing module. The streaming video is processed and transmitted upon detection of the gemstone and the inscribed certificate number in real-time automatically. The streaming video is transmitted through wireless transmission modules to the cloud, where the video-to-image matching process is performed, and matching result is returned.

As a further elaboration of the embodiment of the present invention authentication method for cloud compatibility, the processed streaming video is received by the cloud-based servers through wireless transceiver module of the system. The server module hosts video to image matching scripts as well as databases storing authentic gemstone images. Upon request by any multitude of local edge devices, video-to-image matching methodology is executed in order to provide gemstone authentication result. As further requested by any multitude of local systems. Authentication results are transmitted through the internet or intranet to the corresponding local systems.

Embodiments of the present invention are directed to an adjustable table holding the gemstone in place for video capturing. The table is adjustable by height and orientation to allow for different point-of-views (POV) of the gemstone under authentication.

Embodiments of the present invention are also directed to the battery device and wireless internet and intranet connectivity modules. Through these features, the need for wired connection is removed, along with the lightweight and compact design, portability of the system is achieved.

Overall, the present invention is a gemstone authentication system and methodology employing artificial intelligence algorithms. The system is highly automated and easy to use, wherein extensive training is not required to operate. Additional benefits and features are further realized in the system of the present invention. These aspects are further described in the document. Further information regarding these features can be found in the detailed description of the invention and the drawings.

The invention will be better understood by reference to the following examples, but those skilled in the art will readily appreciate that the specific examples detailed are only illustrative, and are not meant to limit the invention as described herein, which is defined by the claims which follow thereafter. Throughout this application, various references or publications are cited. Disclosures of these references or publications in their entireties are hereby incorporated by reference into this application in order to more fully describe the state of the art to which this invention pertains. It is to be noted that the transitional term "comprising", which is synonymous with "including", "containing" or "characterized by", is inclusive or open-ended and does not exclude additional, un-recited elements or method steps.

The present invention is directed towards addressing the need for a gemstone authentication system that is portable, easy-to-use with edge capability. Regarding the authentication capability, more specifically, the system can capture and process streaming video of a gemstone, automatically detects gemstone physical characteristics and markings, such as inscribed information and certificate number, perform authentication through video to image matching technology and displaying the result. Regarding ease of use, the system can be transportable by the average storefront assistant without assistance of tools, the authentication process is automatic. Regarding edge capability, the system can perform computation and storage requirements coming with video to image matching technology.

Figure 1:
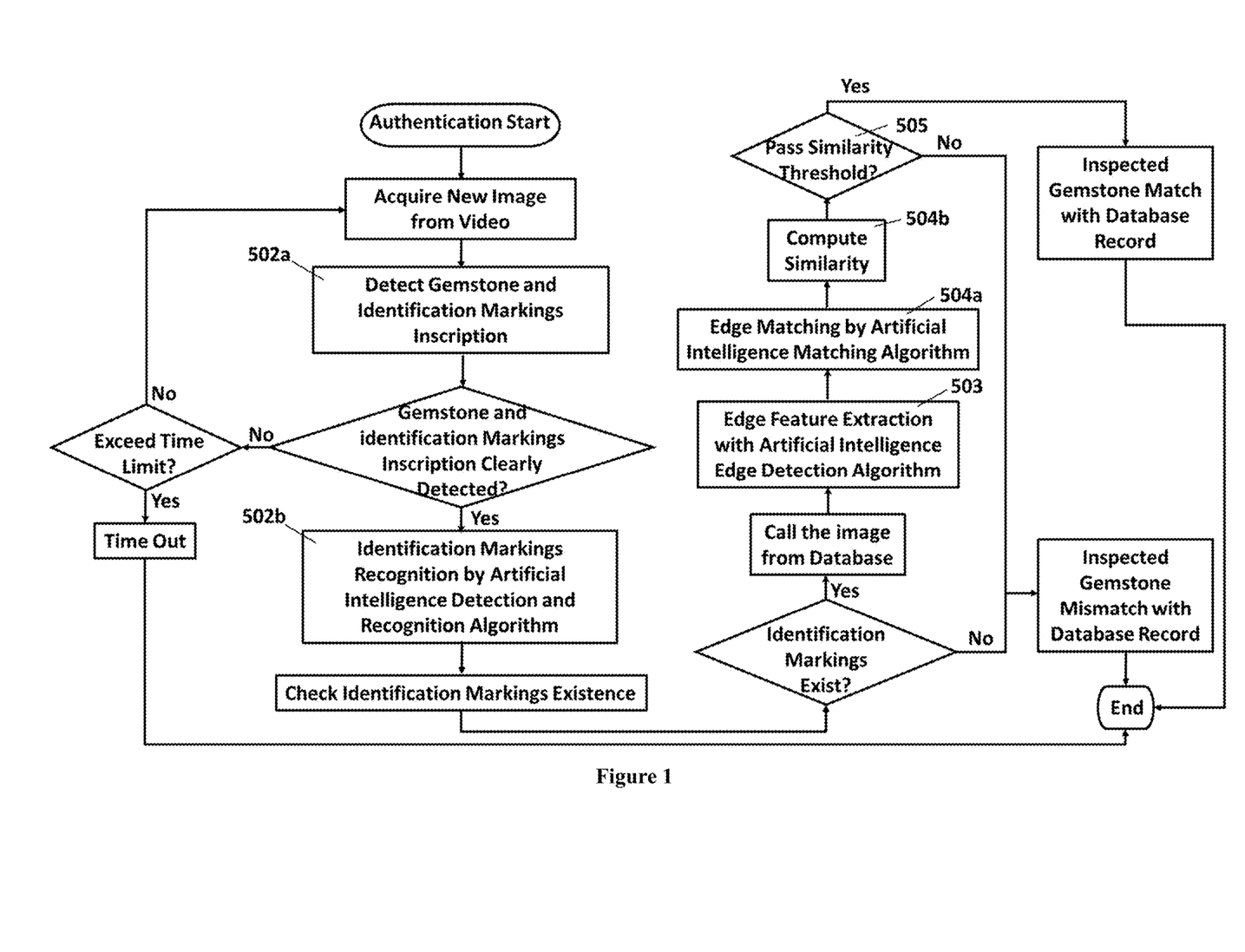
FIG. 1 is a flowchart of the authentication methodology, wherein the process will start once the user flow enters the authentication process.
Figure 2:
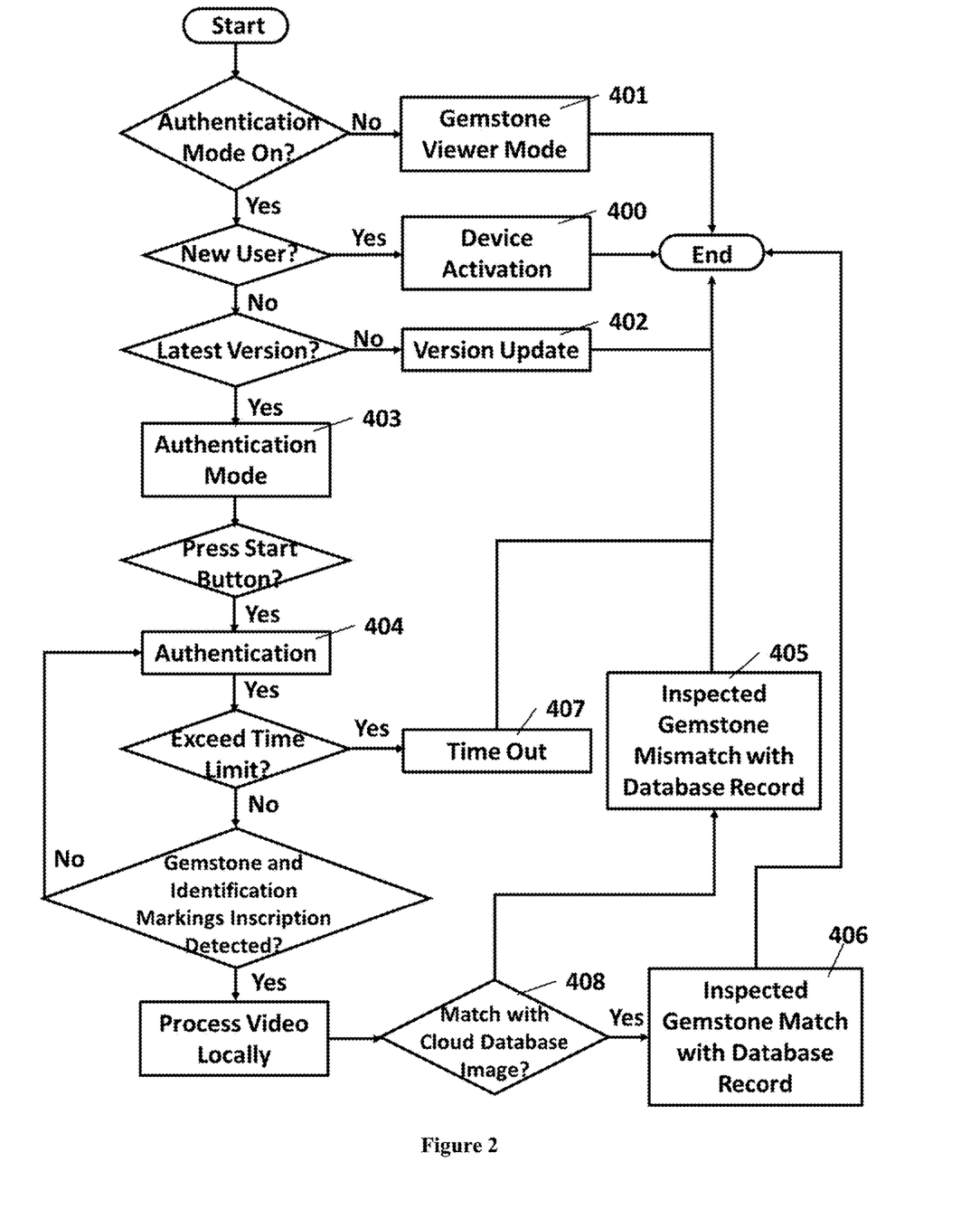
FIG. 2 is a user operation flow diagram describing the intended user operation process of the system.
Figure 3:
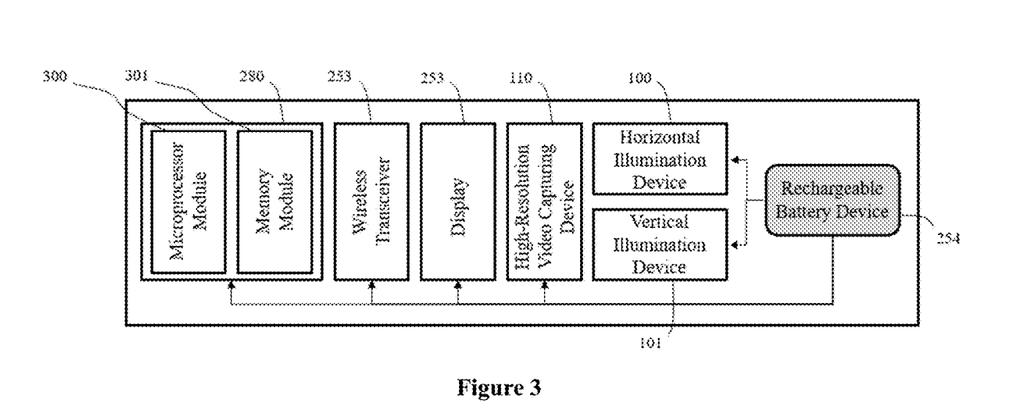
FIG. 3 is a depiction of the modules in the hardware housing of the system, as well as the denoting modules' power connectivity to the rechargeable battery device.

FIG. 1 provides the description of the flow of the authentication methodology; FIG. 2 depicts the overall user operation flow of the authentication system. FIG. 3 depicts the functional modules inside the of the system. The methodology of the present invention will first be described independently of the user operation flow. Then the user operation flow of the system will be described. Both the methodology and user operation flow will contain references to the functional modules of the system, in addition to description of caveats.

The methodology of the present invention pertains to authentication of loose gemstones and gemstones on jewelry items, wherein the gemstone contains at least a unique identification marking or feature or both. With reference to FIG. 1, once the authentication process has been started using the present system of the invention, a streaming video of the inspected gemstone is captured by the high-resolution digital video capturing device 110. At the corresponding time, a frame from the video is sampled as an image, herein called Inspected Image and pass through a custom weighted sum conversion of the color components of the image. In process 502a, the gemstone and corresponding unique identification markings are detected using Artificial Intelligence Detection & Recognition Algorithm running on the local processor unit 280. Upon detection, the unique identification markings or features or both are recognized by the Algorithm and the corresponding machine-readable label in the form of string is returned in 502b. The Artificial Intelligence Detection & Recognition Algorithm is trained using labelled images of markings and gemstones, along with augmentations, allows the algorithm to detect and recognize these gemstones and their unique identification markings or features or both through the images derived from the digital video input during inference phase, and increasing their robustness to variations in image quality, marking shapes, distortion, and lighting conditions. Once the gemstone and the corresponding unique identification markings or features or both are detected and recognized, the corresponding image including the recognized machine-readable label is sent to the cloud server for further processing in the authentication process. In the inference process, it can be possible that nothing is detected. If the gemstone and its corresponding unique identification markings or features or both are not detected within a time limit, the system will time out 407, thereby adding a layer of protection against the misusage of system resources. The detected markings will be used to generate a string of machine-readable text, which is used to retrieve the corresponding gemstone set of reference images.

When the Inspected Image with the gemstone and corresponding label are received by the cloud server, the reference set of images are retrieved from the server using the label. The features of the Inspected Image and the reference set of images are then extracted as edges using Artificial Intelligence Edge Detection Algorithm 503. The edges identified in the gemstone images include edges of facets and girdles, edges of unique markings and physical characteristics. From these edge features, traditional features such as the proportion of the facets, angle of the facets, size of facets, facet intersections, girdle thickness, girdle finishing, inclusions characteristics, proportions of the inscribed information, certificate number, unique identification number as well as custom markings will be inferred. Moreover, the power of Artificial Intelligence Edge Detection is to be able to extract much more deep features without parametric calculations and their robustness against variations. This is based on the Artificial Intelligence Edge Detection Algorithm being trained on the set of reference images and their corresponding annotated edges. Augmentations in the training images are introduced to increase the Algorithm robustness against variation of the image attributes. These augmentations include, but are not limited to, variations in contrast, brightness, rotation, shifting and shear. Through introducing augmentations, these variations could be adapted by the Artificial Intelligence Edge Detection Algorithm. Depictions of extracted edges from Inspected Images are shown in the sub-figures 'Extracted Edge Feature from Inspected Image' in FIG. 4 and FIG. 5 respectively. This feature extraction method is applied to both the Inspected image and the reference set of images to enable the later matching process 504a.

Figure 4:
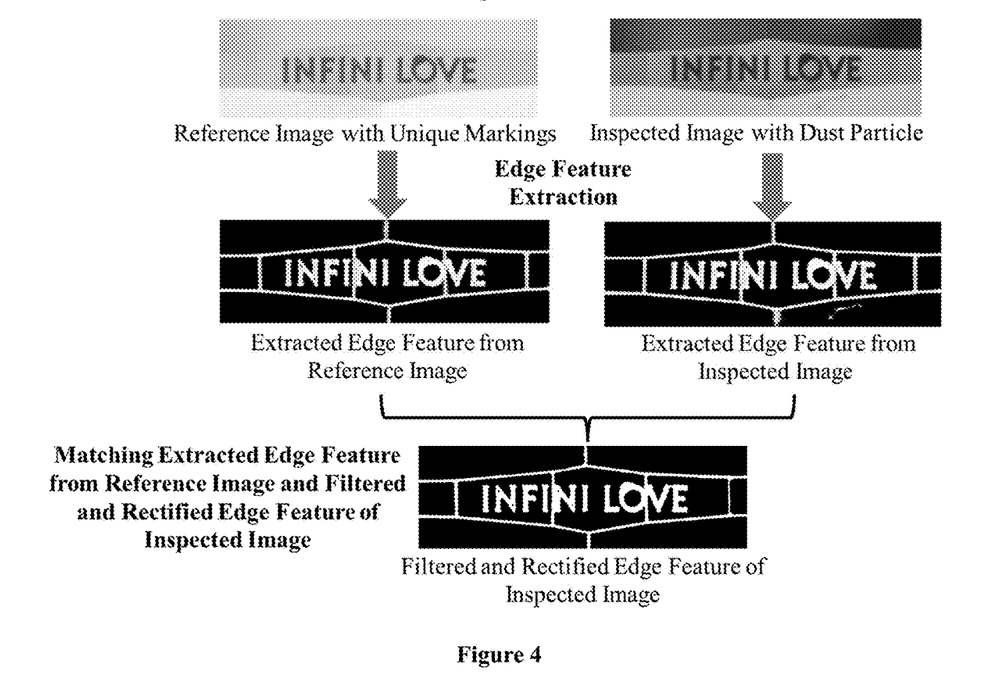
FIG. 4 depicts successful authentication of a matching inspected gemstone sample with database reference image records, even with dust particles present in the 'Inspected Image'. The figure herein further denotes the authentication process and the pictorial result of Artificial Intelligence Edge Detection Algorithm and the filtering result of Artificial Intelligence Matching Algorithm.

Once extracted, these aligned features of edges are then passed along to an Artificial Intelligence Matching Algorithm for feature matching process 504a. The Matching Algorithm is trained on edge features extracted from original and augmented reference images. Therefore, it is able to learn the true edge features from the reference set of images. Once the extracted edge features of the Inspected Image are received, the edge features of the Inspected Image first go through affine transformations to be aligned to the edge features in the reference set of images in order to eliminate any matching error due to POV differences in the Inspected and reference images. Upon alignment, edge features from the Inspected Image are compared to the edge features of the corresponding reference set of images, the matching result is used to compute a Similarity Score 504b. The Score represents the confidence level of the algorithm whether the Inspected Image and the set of reference images are a match. The score scales from 1 to 0, where 1 is confidently a match and 0 is confidently a mismatch, wherein it is trivial to adjust the score to any number of ranges of values. During the matching process, one common difficulty is from the image noise added to the Inspected Image due to dust particles as shown in FIG. 4, where the dust particle outline is also identified as an edge feature. The present invention's methodology allows the Artificial Intelligence Matching Algorithm to distinguish and ignore these noisy edge features during the matching process. The methodology utilizes the edge features from the reference image as a hard filter on the edge features extracted from Inspected Image. In the edge features of the reference image, only the edges which exist in the reference image are preserved, as such any noisy edge features which should not be taken into account during the matching process can be eliminated. In the event of a mismatch, as is the case in FIG. 5, the edge features which are not present in the reference set of images are filtered out from the edge features extracted from the Inspected Image, contributing to a low Similarity Score. This allows the algorithm to handle variations in the captured angle, distortion, and image noise without compromising the matching accuracy. Upon receiving the features from a newly inspected image and from the set of reference images, the algorithm performs the matching and outputs the Similarity Score for post-processing.

The similarity score is passed along to a pre-determined Similarity Threshold 505. The Similarity Threshold, set based on the domain knowledge and security requirements of the entity in operation of the invention, has a value between 0 and 1 or as trivially determined by the corresponding Similarity Score range. The Similarity Threshold is used to judge whether the inspected gemstone should be passed as matching with the reference images in the database. An apparent example of an entity operating the system with extremely low tolerance of counterfeiting would place the threshold as close as possible to 1. Considering a similarity score greater than or equal to the pre-determined Similarity Threshold, the gemstone under authentication will be regarded as matching with database records. On the other hand, considering the case where the similarity score is less than the pre-determined Similarity Threshold, the gemstone under authentication will be regarded as not passing the authentication examination, thus the result will be a mismatch between the inspected gemstone and the database records. The Similarity Threshold is adjustable in accordance with the domain knowledge and security requirements of users of the invention.

Figure 5:
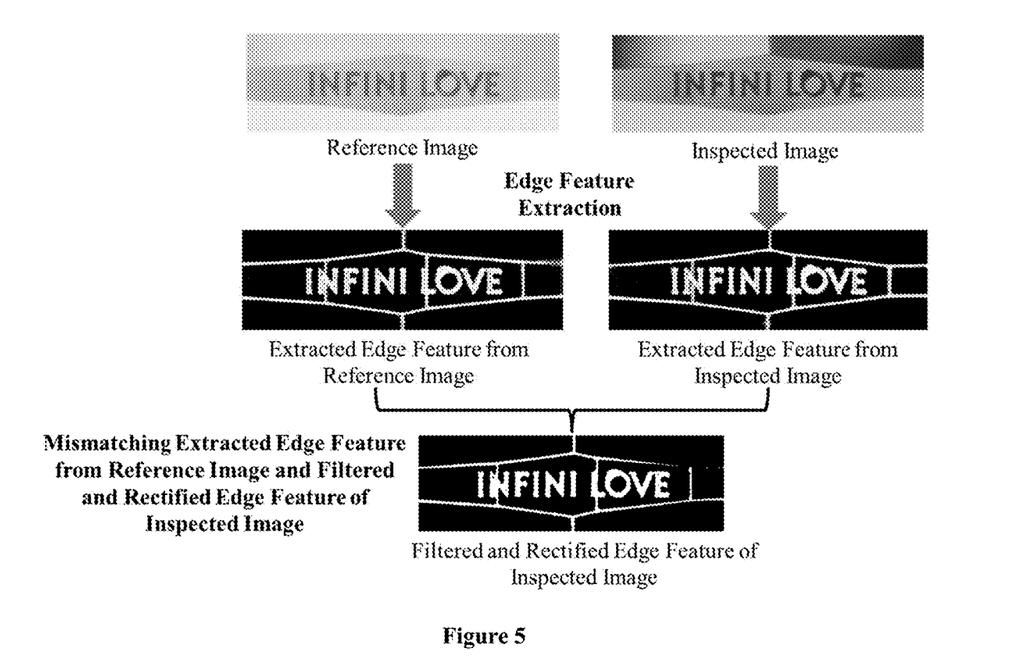
FIG. 5 depicts successful detection of a mismatch inspected gemstone sample with database reference image records. The figure herein further denotes the authentication process and the pictorial result of Artificial Intelligence Edge Detection Algorithm and the filtering result of Artificial Intelligence Matching Algorithm.

In summarization of the methodology in the present invention, a detailed description of the process with reference to FIG. 4 is provided. FIG. 4 depicts successful authentication of a matching inspected gemstone sample with database reference image records. The edge features are first extracted from 'Reference Image with Unique Markings' using Artificial Intelligence Edge Detection Algorithm, resulting in 'Extracted Edge Feature from Reference Image'. The process is repeated for 'Inspected Image with Dust Particle', resulting in the 'Extracted Edge Feature from Inspected Image'. Note the noisy edges from the dust particle under the letter 'V'. The 'Extracted Edge Feature from Reference Image' is used to filter out noise from the 'Extracted Edge Feature from Inspected Image', resulting in 'Filtered Edge Feature of Inspected Image', note the present removal of noisy edges. The Similarity Score is computed by comparing the 'Reference Image with Unique Markings' with 'Filtered Edge Feature of Inspected Image' using the Artificial Intelligence Matching Algorithm. The algorithm can correctly recognize and match the extracted edge features in the images. Thus, the algorithm calculates a high Similarity Score close to 1. If the calculated Score passes the Similarity Threshold set by the user, resulting in successful matching of the inspected diamond with the corresponding record in the database. In further summarization of the methodology in the present invention, a detailed description of the process with reference to FIG. 5 is provided. FIG. 5 depicts successful detection of a mismatch inspected gemstone sample with database reference image records. The same process described in FIG. 4 is applied herein, where a Similar Score is calculated by the Artificial Intelligence Matching Algorithm with respect to the current 'Filtered Edge Feature of Inspected Image' and 'Reference Image with Unique Markings'. In FIG. 5, the algorithm is able to correctly recognize the mismatched features, the gemstone girdle in the inspected image is thinner than the gemstone girdle on the reference image. Thus, the calculated Similarity Score is close to 0. If the Score is unable to pass the Similarity Threshold set by the user, the result is a successful identification of the mismatch between the inspected diamond with the corresponding record in the database.

In an expansion of the methodology described, trivially, by adding more images to the reference set, the same process can be repeated for each individual image. Each image of the reference set will be graded a Similarity Score according to the captured Inspected Images. If all the Similarity Scores surpass the Similarity Threshold, the authentication is successful, the inspected gemstone is determined to be authentic. If one of the Similarity Score cannot pass the threshold, the authentication will fail.

Figure 6:
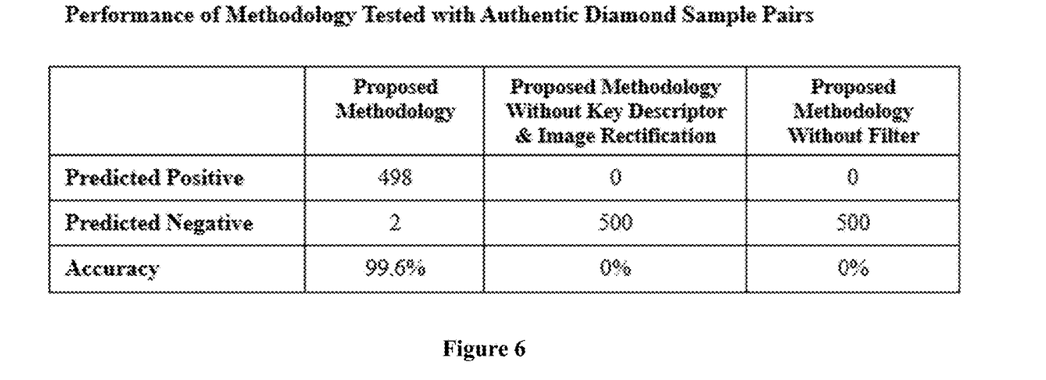
FIG. 6 is a table showing the experimental result of the proposed methodology tested on the experimental dataset, which is comprised of Inspected and Reference Image pairs of authentic diamond samples. The accuracy of the methodology is calculated and compared with the accuracy attained without the key steps proposed in the methodology.
Figure 7:
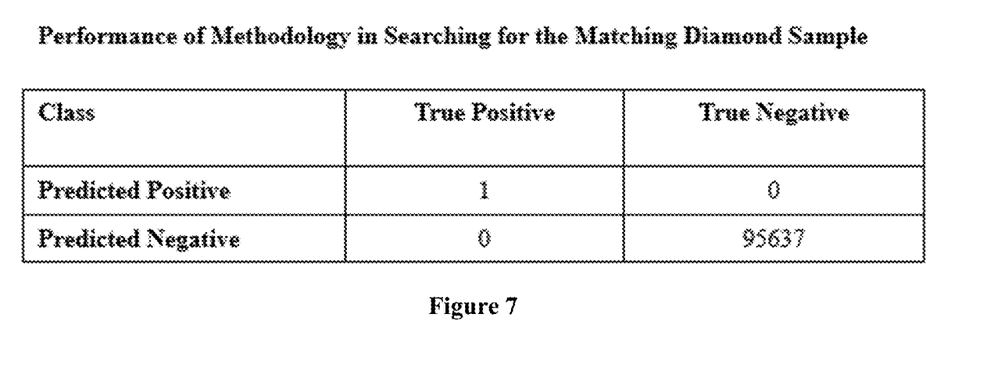
FIG. 7 is a table showing the experimental result of the proposed methodology tested on a dataset of Reference Images of real-world diamond samples. The proposed methodology successfully matches an Inspected Image with the correct Reference Image with no False Positives.

In validation of the performance of the methodology in the present invention, validation results using real gemstone data are provided to prove the efficacy of the steps involved in the methodology. FIG. 7 provides the result of testing the matching of an inspected diamond with the database record of 95638 real diamonds. The methodology is able to correctly identify the inspected diamond from the database record with a 0% False Positive Rate in the database. FIG. 6 provides the result of testing the matching of diamond with the database record. An Inspected Image and the corresponding Reference Image from the database record are paired. Each pair is counted as a sample in the experiment. A Predicted Positive sample therefore represents the methodology is able to correctly recognize the pair as a match. While a Predicted Negative sample represents the methodology incorrectly identify the samples as a mismatch. The methodology is able to achieve 99.6% accuracy based on the experimental dataset of 500 pairs. Through the experiment, the ability of the methodology in recognizing correct pairs of Inspected and Reference Images is validated.

To further substantiate the methodology of the present invention, proof of necessity of the steps in the current methodology is presented in the following paragraphs. The proofs are presented using results from experiments with real diamond samples and data. By taking away some of the key steps in the methodology, the resulting accuracy in the matching pair prediction is used as a justification for the need of these key steps.

In validation of the AI Detection & Recognition Algorithm used in the methodology, the algorithm includes a method of using key descriptors in images to perform image rectification. The importance of key descriptor to be used in image rectification is affirmed through experimental data in FIG. 6. Without using key descriptor to perform image rectification, the matching accuracy is reduced to 0% based on the experimental data.

In a further attest to the methodology, the method of using a filter based on the Reference Image in the AI Matching Algorithm is validated on the dataset on positive pairs of diamonds. The efficacy of the filter based on the Reference Image is proven in FIG. 6. Without using the filter during the matching process, the matching accuracy is again reduced to 0% based on the experimental data.

Figure 8:
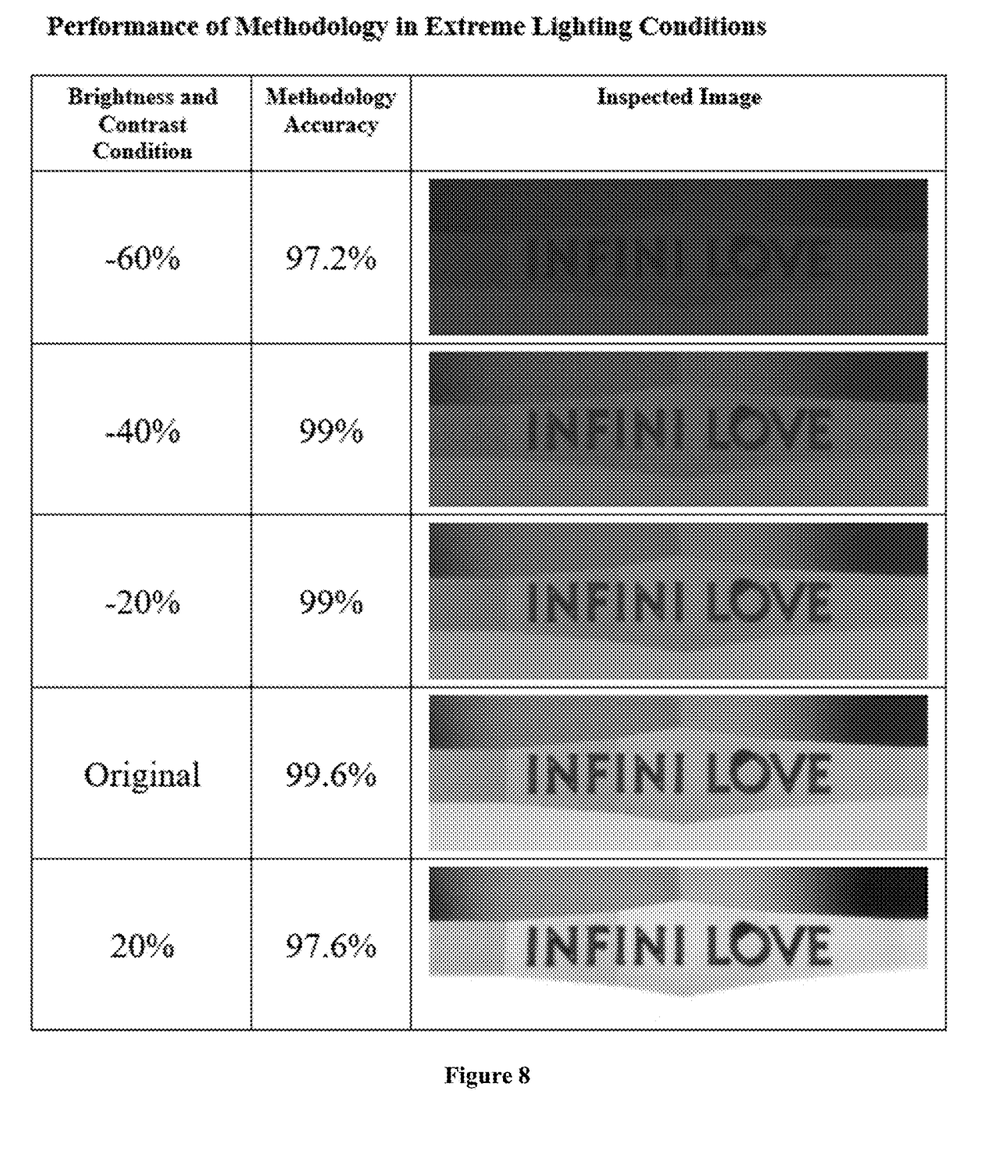
FIG. 8 shows the validation of the ability of the proposed methodology in handling different image and lighting conditions. The table displays the methodology performance under the specified brightness and contrast condition, in terms of the percentage change from the original image. The resulting Inspected Image by applying the specified brightness and contrast condition is also presented.

In a demonstration of the robustness of the methodology in the present invention, the proposed methodology can handle cases with extreme lighting conditions in the storefront. Through experimentation, it is verified that the methodology can handle even extremely low levels of contrast and brightness. In order to test the capability of the methodology in different lighting conditions, the Inspected Image in each pair of images undergoes transformation of a percentage change in contrast and brightness. Both the brightness and contrast were reduced by 60%, 40%, 20% and increased by 20%. Inspected image examples resulting from the transformation are shown in FIG. 8. These brightness and contrast values are selected based on the extreme conditions which are expected to be encountered in a storefront, where the operator can face dimmer lighting conditions than the lab environment. A brighter condition could also be encountered but much less often and is easily rectifiable, therefore, a lower range is selected. The results of the methodology under different lighting conditions are presented in FIG. 8, where the accuracy is higher than 97%.

The present invention also pertains to a system to enable the authentication methodology presented. FIG. 3 depicts the modules inside the hardware housing of the system. The gemstone authentication system includes a high-resolution digital video capturing device 110. The video capturing device's horizontal position is adjustable to find the correct distance to the gemstone to achieve a better focus for the streaming video. To allow for easier inspection, the streaming digital video can be digitally zoomed in and out. The hardware housing 190 consists of a processor unit 280, wireless transceiver module 253, powered by rechargeable battery device 254 also placed in the housing. Horizontal and Vertical illumination devices are integrated to provide optimal lighting conditions for capturing video of the gemstone, the horizontal illumination device provides 100 illuminations for backlighting, the vertical illumination device 101 is supported by flexible cable fittings, allowing the device to be adjusted vertically and rotationally to provide illumination at different heights and angles. The adjustable table is for the placement and capturing video of the gemstone and gemstones on jewelry. The inspected item is placed on a soft holder in adjustable table, it can be operated by changing the height and orientation to allow for different point-of-views (POV) of the gemstone under authentication.

The following sections are continued with reference to FIG. 2 and FIG. 3. To operate the system, the user will start up the system with the power switch. The system will start in Gemstone Viewer Mode 401. The user can then opt to enter Authentication Mode 403 through a button switch.

As mentioned, upon switching to Authentication Mode 403, user verification and software version check will first be performed. Considering the case of a new user, the following procedure is required to be performed by the user for activating the system. The new user will be directed to the Device Activation 400. In Device Activation 400, a QR code is present for the user to scan in the Device Activation User Interface, where the user's identity will be verified through an external verification system. Once verified, the device will be activated for use by adding a unique identification number to the database and the user can proceed to the next steps. In the case of verified user and activated system, the Device Activation 400 is skipped, and the system will directly go forward to the next step, Version Update 402.

Version Update 402 is an automatic process. The Wireless Transceiver module 253 will first transmit the system's software version to the cloud. The cloud server will then execute a script to determine if the version of the software is the most up to date. Considering the case of not up-to-date software, upon determination that the software on the local system is not up to date, the newest version of the software will be received through Wireless Transceiver 253. The update will then be installed on the system automatically. In the case of up-to-date software already present or that there is no internet connection, no new software will be received and installed.

Proceeding from Version Update 402, the system's processor unit 280 in the hardware housing 190, consisting of a processor module 300 and memory module 301, works collaboratively to automatically process the streaming video captured by the high-resolution digital video capturing device 110. The processing unit 280 will, in real-time, execute the gemstone physical characteristics and certificate number inscription detection process loop 404. The user will adjust the point-of-view of the gemstone and the laser inscription by manipulating the adjustable table and focus adjustment knob. The user can also adjust the magnification of the streaming video on display 150 to their convenience.

Once the gemstone physical characteristics and certificate number inscription are detected, the processed video can either be sent to the cloud or to the local processor unit 280 for video-to-image matching. If the processed video is to be sent to the cloud, the transmitted data will be encrypted on transmission, and decrypted on the cloud server side. As described process 404, an automatic time limit test will be performed in the loop, in the case where the gemstone and certification number inscription are not detected, the system will proceed to the 'time out' 407, and the display 150 will show the time out user interface. If the user wishes, the authentication procedure may be restarted by pressing the 'Start' button shown in the UI on display 150.

If the gemstone and the unique markings are detected and recognized using the Artificial Intelligence Detection and Recognition aforementioned, the processed video is sent to the cloud through the wireless transceiver module 253, the cloud server will perform automatic video-to-image matching process 106 against a cloud database with stored images of gemstones, undergoing the methodology described in the present invention.

For the intention of the video-to-image process 408, the cloud database on the cloud server contains sets of encrypted images of gemstones, where each set belongs to a specific certified gemstone. Wherein each set of images of the gemstones can be one or many pictures. The set of images contains at least one image, depicting the unique identification markings or features or both, of the gemstones for recognition purposes.

If the gemstone is determined to be genuine 406 by matching with a gemstone imagery record in the database, the display module 150 is brought to an "Authentication Passed" page, confirming the gemstone's authenticity. If the gemstone is found to be counterfeit or unable to match with any gemstones recorded in the database 405, the display is brought to an "Authentication Failed", indicating that the gemstone does not match with database records, thus completing the automatic authentication procedure. The automatic authentication procedure is important to the functionality of the system as it increases the system's ease of use and reduces the training needed for operation by workers without gemologist training, further reducing the testing duration and human error involved in the gemstone authentication process. One such deployment scenario is at the jewelry storefront, operated by sales personnel.

In addition, the gemstone authentication system includes a battery module 254 for powering the system, which allows for portability and, along with the wireless transceiver module 253, eliminates the need for wired connections. The compact and portable design of the gemstone authentication system makes it easy to transport and deploy in storefronts.

As shown above, the system's capability to perform authentication with or without internet or intranet connectivity, automatic authentication process and portability, makes the system suitable to, but not limited to, deployment in storefronts or laboratory environments.

What is claimed is:

1. A computer implemented method to identify a specific gemstone with a known reference point, comprising the steps of:
   a. detecting said known reference point from a source image of said specific gemstone;
   b. Retrieving one or more reference images of possible gemstones from a gemstone database based on said known reference point;
   c. Extracting edge features from said source image and said one or more reference images;
   d. Computing a similarity value by matching said edge features from each of said one or more reference images against said source image, wherein said matching comprises using edge features from said one or more reference images as a hard filter on the source image; and
   e. Identifying said specific gemstone from said one or more reference images based on said similarity value.

2. The method of claim 1, wherein said known reference point is an inscribed marking or a natural marking.

3. The method of claim 1, wherein said source image is a still image from a camera or images processed from a streaming video.

4. The method of claim 1, wherein one or more of said steps (a), (b), (c), or (d) are conducted with an artificial intelligence algorithm.

5. The method of claim 4, wherein said artificial intelligence algorithm is trained using labelled images of markings and gemstones, along with augmentations.

6. The method of claim 1, wherein one or more of said steps (a), (b), (c), or (d) comprise filtering image noise.

7. The method of claim 1, wherein said known reference point is on, nearby or outside girdle of said specific gemstone.

8. The method of claim 1, wherein said step (b) comprises generating a string of machine readable text based on record of said known reference point and retrieving said one or more reference images recorded with said string of machine readable text.

9. The method of claim 1, wherein said step (d) comprises aligning edge features of said source image and said one or more reference images.

10. The method of claim 1, wherein said step (e) comprises retaining only images with said similarity value over a threshold value.

11. A non-transitory computer-readable storage medium comprising instructions stored therein which, when executed by one or more processors, cause the one or more processors to perform operations comprising the method of claim 1.

12. A system to identify a specific gemstone using the computer implemented method of claim 1, comprising:
 a. one or more devices adapted to obtain a source image, each of said one or more devices comprising:
  i. a first processor;
  ii. a memory unit having executable instructions stored thereon, which, when executed, cause the first processor to execute step (a) of said computer implemented method;
  iii. a first communication module;
 b. a server comprising a second processor, said gemstone database, a second communication module and a memory unit having executable instructions stored thereon, which, when executed, cause the second processor to execute steps (b) to (e) of said computer implemented method;
wherein said known reference point is detected and transmitted from the first communication module to the second communication module;
said specific gemstone is identified and transmitted from the second communication module to the first communication module.

13. The system of claim 12, wherein said first communication module or second communication module is a wireless communication module.

14. The system of claim 12, wherein each of said one or more devices comprise a camera or a video camera for obtaining said source image.

15. The system of claim 14, wherein each of said one or more devices comprise illumination for optimal lighting condition for capturing of said source image.

16. The system of claim 14, wherein said system further comprises an adjustable table for positioning said specific gemstone to obtain said source image.

17. The system of claim 12, wherein at least one of said one or more devices is a portable device.

18. The system of claim 12, wherein said server is a cloud server.

* * * * *